United States Patent [19]

Koers

[11] Patent Number: 4,778,488

[45] Date of Patent: Oct. 18, 1988

[54] PROCESS AND APPARATUS FOR SEPARATING SOLID PARTICLES AND GASEOUS MATERIALS

[75] Inventor: Jellard J. Koers, The Hague, Netherlands

[73] Assignee: Shell Internationale Research Maatschappij, B.V., The Hague, Netherlands

[21] Appl. No.: 734,292

[22] Filed: May 14, 1985

[30] Foreign Application Priority Data

May 31, 1984 [GB] United Kingdom ................. 8413871

[51] Int. Cl.[4] .............................................. B01D 45/12

[52] U.S. Cl. ............................................ 55/1; 55/394; 55/431; 55/459.1; 208/410; 48/77; 48/210; 48/197 R

[58] Field of Search ....................... 208/410; 55/61, 83, 55/1, 459 R, 431, 261, 263, 345, 338, 394; 422/147, 144; 48/77, 210, 197 R

[56] References Cited

U.S. PATENT DOCUMENTS

| | | | |
|---|---|---|---|
| 1,818,905 | 8/1931 | McGee | 55/338 |
| 4,439,306 | 3/1984 | Voetter et al. | 208/8 R |
| 4,455,220 | 6/1984 | Parker et al. | 55/459 R |
| 4,477,339 | 10/1984 | Whaley | 55/431 |
| 4,516,989 | 5/1985 | Mink et al. | 55/1 |
| 4,671,806 | 6/1987 | Still et al. | 55/431 |

FOREIGN PATENT DOCUMENTS

| | | | |
|---|---|---|---|
| 700511 | 12/1953 | United Kingdom | 55/481 |
| 148023 | 7/1961 | U.S.S.R. | 55/459 R |

*Primary Examiner*—Bernard Nozick
*Attorney, Agent, or Firm*—Jones, Tullar & Cooper

[57] ABSTRACT

Solid particles and gaseous materials are separated by passing a suspension of solid particles and gaseous materials into the upper section of a cyclonic separation vessel equipped with a cyclonic swirl zone which may contain vortex stabilizing means and a lower dense bed zone which may contain stripping means, and wherein separated gaseous materials are removed from the upper section of the cyclonic zone and solid particles are passed in the lower dense bed zone, from which particles are removed by aeration through a discharge means which communicates with the dense bed zone.

The present process and apparatus are preferably applied in the separation of gaseous materials from solid particles entrained in hot flue gases obtained in the combustion stage of a process for extracting hydrocarbons from hydrocarbon-bearing substrate such as oil shale and tar sand.

10 Claims, 1 Drawing Sheet

PROCESS AND APPARATUS FOR SEPARATING SOLID PARTICLES AND GASEOUS MATERIALS

Figure 2:
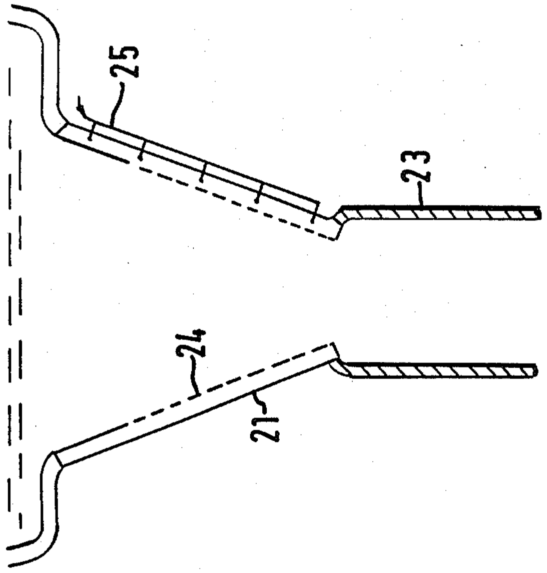

The present invention relates to a process for separating solid particles and gaseous materials, in particular hot solid particles and gaseous materials present in processes for the extraction of hydrocarbons from a hydrocarbon-bearing substrate such as an oil shale, tar sand or a bituminous coal. The present invention also relates to an apparatus to be used in the separation process. It is well-known that hydrocarbons can be extracted from hydrocarbon-bearing substrates by heating particles of the substrate at a temperature of at least 400° C. in the substantial absence of oxygen, and recovering the liberated hydrocarbons. In the case of oil shale this process is usually referred to as retorting and, in the case of bituminous coal, it is called pyrolysis. Generally, a process for extracting hydrocarbons from hydrocarbon-bearing substrates such as an oil shale comprises three subsequent stages: pre-heating, retorting and combustion.

It is advantageous that substrate particles used in the extraction process are subjected to a separate pre-heating/drying stage, i.e. heating them to a temperature below that at which the proper extraction process takes place. Heat transfer to the substrate particles may be carried out by any suitable method. A preferred method comprises heating the substrate particles with a solid heat-bearing medium by indirect counter-current flow, using a series of heat transfer loops each containing a suitable circulating heat transfer fluid (e.g. methanol, water or diphenyl/diphenyl oxide) preferably chosen such that the whole series permits a staged rise in temperature of the fresh substrate particles and a staged drop in temperature of the solid heat-bearing medium. Any solid heat-bearing medium such as sand may be used but preference is given to the use of hot spent substrate obtained in further processing. The substrate particles and the hot spent substrate are preferably each maintained in a substantially fluidized condition. This can be achieved suitably by using air and/or steam as the fluidizing gas, preferably supplied via a common line. The preferred means of circulating the heat transfer fluid in the loops is by means of the so-called thermosyphon effect. The substrate particles are normally pre-heated to about 250° C. using hot spent substrate having a initial temperature of about 800° C. as the heat-bearing medium.

The retorting stage comprises a number of compartments each provided with a steam inlet and a separate upper inlet for introducing hot spent shale from the combustion zone into the fluidized bed of hydrocarbon-bearing substrate particles which entered the first compartment after the pre-heating stage and passed on successively to the other compartments via a system of baffles or weirs. Hydrocarbons liberated from the shale particles together with steam from each zone are passed via cyclones to a product removal line. The retorting is normally operated at temperatures in the range of 400°-500° C., preferably 450°-500° C..

In the combustion stage combustion of coke-bearing spent shale is achieved by treatment with an oxidizing gas such as air which normally is pre-heated to achieve proper ignition. Hot spent shale particles of temperatures up to 850° C. are obtained in the combustion stage and may be recycled to the retorting stage to serve as a solid heat-bearing medium for direct heat-exchange and/or the pre-heating stage (to serve as solid heat-bearing medium for indirect heat exchange). British patent specification No. 2,097,017, corresponding to U.S. Pat. No. 4,439,306, disclosing detailed information on the extraction of hydrocarbons from hydrocarbon-bearing substrates are incorporated herein by way of reference.

One of the problems to be soled when mixtures of (hot) solid particles and gaseous materials are to be separated, such as solid laden flue gases obtained in combustion or catalytic conversion processes, comprises an efficient method of separation, combined with subsequent recovery of the solid particles. Since hot solid particles obtained from flue gas emitted during the combustion stage of a process for the extraction of hydrocarbons from hydrocarbon-bearing substrates are very useful, it would be most attractive not only to be able to recover such particles but moreover to be able to control the direction and the amount of the outflow of collected hot solid particles.

A process has now been found wherein a cyclonic separation vessel is used which allows controlled outflow of solid particles by means of aeration via a discharge means.

The present invention therefore relates to a process for separating solid particles and gaseous materials wherein a suspension of solid particles and gaseous materials is passed into the upper section of a cyclonic separation vessel equipped with a cyclonic swirl zone which may contain vortex stabilizing means and a lower dense bed zone which may contain stripping means, and wherein separated gaseous materials are removed from the upper section of the cyclonic zone and solid particles are passed into the lower dense bed zone, from which particles are removed by aeration (as defined hereinafter) through a discharge means which communicates with the dense bed zone.

The present process preferably relates to a process for separating solid particles and gaseous materials wherein the discharge means comprises an inverted truncated cone.

The present invention relates in particular to a process for separating hot solid particles and gaseous materials obtained in the combustion stage of a process for extracting hydrocarbons from hydrocarbon-bearing substrates wherein the solid particles and gaseous materials are separated in a cyclonic separation vessel wherein solid particles collected in the lower dense bed zone are removed by aeration using an inverted truncated cone as discharge means.

The process according to the present invention can be carried out conveniently using a cyclonic separation vessel comprising vortex stabilizing means which allows the combination of the cyclone separator and a downstream stripper so that stripping gas can proceed to the cyclonic separation zone without substantial loss of efficiency. The strength and stability of the vortex are of primary importance in determining both separation efficiency and erosion resistance of a cyclone. By "stability" is meant that the vortex is held in the centre of the cyclone and that the turbulent energy dissipation is reduced. The combined cyclone zone/vortex stabilizing means/stripping zone achieves the concomitant benefit of quick stripping to remove bulk vapour as well as interstitial vapour and provides a longer stripping time to desorb residual hydrocarbons and/or oxygen-containing material from the solid particles.

Generally, vortex stabilizers in the form of a solid flat plate or circular disk can be used satisfactorily. Advantageously a vortex pin, also called a vortex finder may be added to the stabilizer to restrict and centre the lateral motion of the vortex. A vortex finder is preferably applied when the vortex is located at a distance of 5–8 vortex outlet tube diameters from the vortex outlet in the upper section of the cyclonic zone. The vortex finder is suitably a vortex finder rod attached to the centre of the stabilizer means and extending upwardly towards the cyclone swirl zone. Preferably such a vortex finder would be greater than about one third of the vortex length. The vortex stabilizing means are made up of substantially inert materials such as stainless steel and alloys such as Incoloy and Hastelloy. Part or all of the means may be composed of ceramic material.

It is also possible to use vortex stabilizing means comprising an open axial passageway through which gas flows from the stripping zone to the core of the vortex present in the cyclone zone. The presence of an axial hole in the vortex finder plate (and pin) allows the return of entrained gas separated from solid particles in the stripping zone below the vortex stabilizing means by virtue of the pressure differential operating across the axial hole to the gas outlet through the core of the cyclone.

If desired the gaseous materials removed from the upper section of the cyclonic zone may be subjected to a further separation using one or more conventional cyclones which lower zone(s) communicate(s) with the lower dense bed zone of the cyclonic separation vessel. The lower section of the cyclonic separation vessel comprises, during operation, a dense bed which may be provided with stripping means to allow stripping of interstitial materials from hot spent substrate present in the dense bed. Steam or any other suitable gas can be applied as stripping agent and is introduced into the dense bed, for instance by means of nozzles situated therein which are connected, preferably via a common conduit, to the source of the stripping agent.

The dense bed also serves as a calming and/or deaeration buffer zone which facilitates removal of hot spent substrate via the discharge means to be discussed hereinafter. Suitably, the height of the dense bed is between 1/20 and ¼ of the total length of the cyclonic separation vessel, depending on the material processed.

The discharge of solid particles such as hot spent substrate from the dense bed in the lower section of the cyclonic separation vessel is promoted by means of aeration, i.e. by allowing a stream of a gas to aerate the dense phase formed by particles present in the discharge means communicating with the dense bed, which particles are then removed via a standpipe communicating with the outlet of the discharge means. The discharge means is equipped with at least one inlet system for aeration gas. Suitable aeration gases comprise air, nitrogen, steam, carbon dioxide, flue gas as well as mixtures thereof. The aeration gases are normally supplied from external sources. The gas flow will be dependent on the actual size and design of the discharge means, and may vary between 0.2 and 80 $m^3/h$. Preferably aeration is achieved using a gas flow between 1 and 60 $m^3/h$. Preferably, the discharge means is in the form of an inverted truncated cone and aeration gas is introduced via a sintered or perforated plate mounted inside the cone. It is also possible though not preferred to introduce aeration gas via nozzles present in the discharge means. Inverted truncated cones having half-included cone angles between 10° and 40° are suitably applied. The cones should be designed in such a way that funnel flow of solid particles is substantially prevented. In order to facilitate removal of aerated solid particles, the discharge means preferably debouches (discharges) into a standpipe having a cross-sectional area which is preferably at least twice as large as the smallest cross-sectional area of the discharge means, thus minimizing bridging of the free throat area by solid particles. It is also advantageous to process rather small particles, for instance particles having a largest diameter less than 5 mm, preferably less than 3 mm.

If desired, two or more discharge means, e.g. up to 12 inverted truncated cones may be communicating with the dense bed. Such a construction has the added advantage that various particle streams are obtained which can be used for different purposes, such as transportation to different locations.

The process according to the present invention can conveniently be used in the separation of hot shale particles and gaseous materials obtained during a process for extracting hydrocarbons from hydrocarbon-bearing substrate by heating particles of the substrate in the substantial absence of oxygen at a temperature of at least 400° C., to give coke-bearing substrate and liberated hydrocarbons and subjecting the coke-bearing substrate to combustion. Shale particles entrained in hot flue gases produced in the combustion stage of the extraction process can be separated efficiently using the cyclonic separation vessel referred to hereinbefore.

The flue gases entering the cyclonic separation vessel will normally have a temperature well above 500° C., e.g. between 700° C. and 900° C.. The separated solid particles still being at a temperature well above 500° C. are conveniently at least partly recycled to the retorting stage of the extraction process referred to hereinbefore to serve as heat-bearing medium for direct heat-exchange and/or to the cooling section of the pre-heating/drying stage to serve as heat-bearing medium for the indirect heat-exchange with fresh particles to be heated prior to retorting. It is also possible to recycle part or all of the separated particles to the combustion stage. In practice, part of the hot solid particles obtained will be recycled to the retorting and/or pre-heating stage and part to the combustion stage.

A further aspect of the present invention comprises the provision of an apparatus suitable for carrying out the process according to the present invention comprising a cyclone separator having an inlet means for receiving suspensions of (hot) solid particles and gaseous material from a conduit; an upright hollow housing attached to said inlet means and cooperating therewith to form a swirl zone wherein said suspensions are formed into a fluid vortex, said hollow housing including vortex outlet means mounted in the upper section of said housing for removing gaseous materials and outlet means mounted in the lower section of said housing for removing solid particles; means for supporting a dense bed near the bottom of said housing; discharge means communicating with the bottom of the dense bed and having inlet means for receiving aerating agent and outlet means for removing aerated solid particles.

In a preferred embodiment of the apparatus vortex stabilizing means are mounted in the middle section of said housing, thereby defining between said stabilizer means and said upper vortex outlet a cyclone zone, wherein solid particles are separated from gaseous materials to form a cleaned fluid, for stabilizing and centring said vortex to minimize re-entrainment of said particles into said cleaned fluid. The vortex stabilizing means conveniently comprises a solid disk or plate which may have attached to the centre thereof and extending upwardly towards the cyclonic swirl zone a vortex finder rod.

The vortex stabilizing means may include an open axial passageway.

The apparatus according to the present invention may also include stripping means within the dense bed to strip gaseous materials from solid particles present in the dense bed. The apparatus may also be provided with one or more secondary cyclones which lower zone(s) communicate with the dense bed.

The discharge means communicating with the dense bed may be any discharge means provided with aeration means, for instance a standpipe comprising one or more inlets for introducing aerating gas into the particles present in the discharge means. If desired, the aerating gas can be introduced via a nozzle system located within the discharge means and connected to a common supply line to introduce aerating gas from an external source.

Preferably the apparatus to be used in the process according to the present invention comprises an inverted truncated cone as discharge means. Inverted truncated cones having half-included cone angles between 10° and 40° can be suitably applied, in particular when they govern mass flow of solid particles during the discharge.

The discharge means preferably debouches into a standpipe having a cross-sectional area which is at least twice as large as the smallest cross-sectional area of the discharge means, thus minimizing bridging of the free throat area by solid particles. If desired, a number of discharge means, e.g. up to 12 inverted truncated cones may be communicated with the dense bed.

The extraction process wherein the apparatus described hereinbefore is applied may comprise a number of combustion stages, fed by materials originating from different parts of the retorting stage, wherein each combuster is provided with one or more cyclonic separation vessels as described hereinbefore, which each may be equipped with one or more secondary cyclones.

Figure 1:
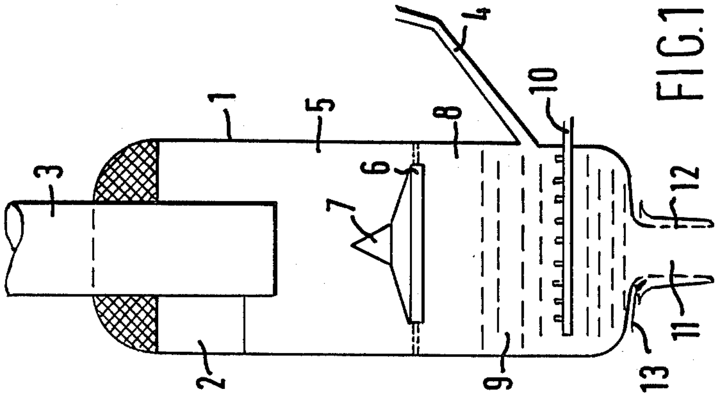

The invention is now illustrated by further reference to the accompanying drawings, in which FIG. 1 represents a cyclonic separation vessel according to the present invention also equipped with vortex stabilizing means and stripping facilities and FIG. 2 represents a more detailed embodiment wherein the discharge means is in the form of an inverted truncated cone.

Referring to FIG. 1, the cyclonic separation vessel 1 has a wide rectangular inlet 2 to receive suspensions of hot solid particles and gaseous materials (such as hot fuel gases containing entrained shale particles). Gas exits from the cyclonic separation vessel via pipe 3. Particles still present in the cyclonic overhead may be collected by one or more secondary cyclones (not shown) and introduced via a secondary cyclone particle outlet 4 into the lower section of the cyclonic separation vessel. The suspension entered via 2 proceeds to a cyclonic swirl zone 5 which optionally contains a vortex stabilizing means 6 which may be provided with a vortex finder 7, located at a suitable distance from the bottom of clean gas outlet pipe 3. Below the vortex stabilizer 6 is a stripping zone 8 and connected thereto a dense bed 9. Normally the internal diameter of the dense bed is equal to that of the swirl zone. Stripping agent may be provided into the dense bed 9 via a nozzle system 10 equipped with a common conduit. The solid particles collected in the dense bed 9 are removed from the cyclonic separation vessel 1 by means of discharge means 11 communicating with dense bed 9 and provided with openings 12 to allow access of aerating agent 13. FIG. 2 shows a more detailed embodiment of preferred discharge means. The discharge means is in the form of an inverted truncated cone 21 communicating with the outlet of dense bed 9. The discharge means has a half-include cone angle of 30° . The diameter of the inverted cone is about three times as large at the outlet of the dense bed than it is at the connection with the standpipe 23. The cross-sectional area of the standpipe 23 is preferably at least twice as large as the smallest cross-sectional area of the inverted truncated cone, depending on the material processed. The inverted truncated cone is provided with a sintered plate 24 to allow access of aerated gas, for instance via conduit 25 to the solid particles present in the discharge means.

It will be clear that the present invention is by no means restricted to the embodiments presented within the specification. Especially the vortex stabilizing means, the stripping means and the discharge means provided with aerating systems may vary from the embodiments actually disclosed without derogating from the present invention.

I claim:

1. A process for separating solid particles and gaseous materials, comprising the steps of:
   - providing a cyclonic separation vessel with an upper section equipped with a cyclonic swirl zone and a lower dense bed zone including discharge means communicating therewith;
   - forming the discharge means as an inverted truncated cone;
   - passing a suspension of solid particles and gaseous material into the upper section of the cyclonic separation vessel;
   - removing separated gaseous material from the upper section of the cyclonic separations vessel;
   - removing particles by aeration form the lower dense bed zone through the discharge means; and
   - providing the lower dense bed zone with stripping means.

2. The process as defined in claim 1, comprising the further step of:
   - forming the inverted truncated cone to discharge into a standpipe having a cross-sectional area which is at least twice as large as the smallest cross-sectional area of the discharge means.

3. The process as defined in claims 1, comprising the further step of:
   - forming the inverter truncated cone to have a half-included cone angle of between 10% and 40%.

4. The process as defined in claims 1, comprising the further step of:
   - utilizing the dense bed zone as a calming buffer zone.

5. The process as defined in claim 1, comprising the further step of:
   - utilizing the dense bed zone as deaeration buffer zone.

6. The process as defined in claim 1, comprising the further step of:
   - utilizing the dense bed zone as a calming and deaeration buffer zone.

7. The process as defined in claim 1, wherein:

air, nitrogen, steam, carbon dioxide, flue gas or mixtures thereof serve as aeration means for removing the particles through the discharge means.

8. An apparatus for separating solid particles and gaseous materials comprising a cyclonic separation vessel, having:

an upright hollow housing including a upper section and a lower section;

inlet means connected to said housing through which suspensions of solid particles and gaseous materials are received;

said housing and inlet means forming a swirl zone wherein the suspensions are formed into a fluid vortex;

vortex outlet means mounted in the upper section of said housing for removing gaseous materials;

a dense bed defined in the lower section of said housing, said dense bed including means for injecting stripping gas to strip gaseous materials from solid particles; and discharge means communicating with the bottom of the dense bed, said discharge means comprising an inverted truncated cone and including inlet means for receiving an aeration agent and outlet means for removing aerated solid particles.

9. An apparatus according to claim 8, wherein the inside of the inverted truncated cone is provided with a perforated wall to allow passage of aerating gas to solid particles present within the inverted truncated cone.

10. An apparatus according to any one of claims 8, wherein the outlet means of the discharge means discharges into a standpipe having a cross-sectional area which is preferably at least twice as large as the smallest cross-sectional area of the discharge means.

* * * * *